United States Patent [19]
Northfleet et al.

[11] Patent Number: 6,162,330
[45] Date of Patent: Dec. 19, 2000

[54] METHOD FOR RESTRICTING AIR ENTRAPMENT IN A PAPER MAKING PROCESS

[75] Inventors: Christina Northfleet, Brussels; Franck Renauld, Chaumont Gistoux, both of Belgium

[73] Assignee: Dow Corning S.A., Seneffe, Belgium

[21] Appl. No.: 09/510,877

[22] Filed: Feb. 22, 2000

Related U.S. Application Data

[63] Continuation of application No. 09/191,035, Nov. 12, 1998.

[30] Foreign Application Priority Data

Nov. 14, 1997 [GB] United Kingdom .................. 9724072

[51] Int. Cl.$^7$ .......................... D21H 11/00; D21H 23/00; B01D 19/04; C09K 3/00
[52] U.S. Cl. ...................... 162/164.4; 162/158; 516/123; 516/124; 516/132; 516/133; 516/134; 516/130
[58] Field of Search ................................ 162/164.4, 158, 162/190; 516/123, 124, 130, 131, 132, 133, 134

[56] References Cited

U.S. PATENT DOCUMENTS

| | | | |
|---|---|---|---|
| 3,528,929 | 9/1970 | Buckman et al. | 252/358 |
| 4,032,473 | 6/1977 | Berg et al. | 252/358 |
| 4,082,689 | 4/1978 | Heyden et al. | 252/321 |
| 5,543,082 | 8/1996 | McGee et al. | 252/321 |

FOREIGN PATENT DOCUMENTS

| | | | |
|---|---|---|---|
| 0341952A3 | 11/1989 | European Pat. Off. | B01D 19/04 |
| 0663225A1 | 7/1995 | European Pat. Off. | B01D 19/04 |

OTHER PUBLICATIONS

Handbook for Pulp and Paper Technologists—2nd Eddition, G.A. Smook, p. 230, 1992.

*Primary Examiner*—Stanley S. Silverman
*Assistant Examiner*—Dionne A. Walls
*Attorney, Agent, or Firm*—Timothy J. Troy

[57] ABSTRACT

A method for restricting air entrapment in white water of a paper making process is described, which comprises adding to said white water a polysiloxane having an Si—C bonded substituent with at least one ether or alcohol oxygen. Preferably certain siloxane oxyalkylene copolymers or certain siloxane oxyalcohols are used.

18 Claims, No Drawings

6,162,330

METHOD FOR RESTRICTING AIR ENTRAPMENT IN A PAPER MAKING PROCESS

This application is a Continuation of Ser. No. 09/191,035 filed Nov. 12, 1998.

FIELD OF THE INVENTION

This invention relates to a method for restricting air entrapment in a paper making process, in particular by restricting the entrapment in white water used in said process.

BACKGROUND OF THE INVENTION

In general paper making processes comprise a step where pulp enters a pressurised head box where it is agitated in water for optimum dispersion in the water. The pulp dispersion is then dispensed through a slit in the head box onto a moving wire screen where it forms a continuous web. The web is partly de-watered by gravity drainage, and is subject to suction which removes additional water. The web structure is then consolidated on a series of roll presses where additional water is removed. The web is further dried on steam-heated cylinders where the remaining water is evaporated to produce a dry paper sheet. One machine known in the art to perform this process is a Foudrinier-type paper mill.

In the above paper making process, air may be entrapped in the water used in this process, for example, during pulp agitation in the head box and during drainage where free-draining water, also called white water, falls into collecting trays. These collecting trays funnel the white water into a wire pit which is generally placed under a moving wire screen. To release the air in the white water within the wire pit, it is generally desirable to run the white water through a relatively long section of open channel. The resultant water is then recirculated in the paper making process, i.e., generally to dilute the pulp mixture in the headbox.

The white water in the above process may also contain substantial quantities of materials such as surfactants, fatty soaps, cellulose derivatives, inks and process chemicals such as sizing aids. Many of these materials cause foaming of the white water when it is agitated in presence of air. This foaming becomes more of a problem as the white water is reused in the process since the concentration of such materials increases at each recirculation. Often the temperature of the white water also increases steadily and white water may be at a temperature of from 50 to 70° C.

Air may be entrapped in the water used in the paper making process in several ways. It is important to control this air entrapment so that the dry paper sheet has a uniform quality. Specifically, if air entrapment in the white water is not restricted, the strength of the wet web may be lowered and the paper sheet may have increased porosity, reduced smoothness and decreased strength.

Several methods of restricting air entrapment in white water of the paper making process have been proposed in the art. For instance, it has been proposed to use mechanical means to restrict the amount of air entrapped or to allow the air to escape after it has been entrapped. Similarly, it has been proposed to use chemical foam control agents such as $C_7$–$C_{22}$ alcohols, polyalkylene glycols, fatty acids, fatty acid esters, amides, and organic phosphates. These approaches, however, are still in need of improvements.

Similarly, polysiloxane based foam control agents for aqueous systems have been used in the paper making process. The use of these materials may be limited, however, because they may cause spotting in the dry paper sheet. Moreover, polysiloxanes may interfere with the physical properties of the paper and they may interfere with the printing and coating process of paper.

U.S. Pat. No. 3,528,929 describes a foam control composition which comprises finely divided silica dispersed into a mixture of mineral oil, a hydrophobic agent and an alkoxysilicon chloride. This composition is taught to assist in de-aeration and drainage during the paper making process. Silica may, however, have detrimental effects on the paper and/or the paper mill.

It is, therefore, desired to provide a method which restricts air entrapment in the white water in the paper making process and which obviates the problems of the prior art processes. We have surprisingly found that certain siloxane based materials are especially useful as foam control agents in the paper making process, despite the above mentioned concerns about polysiloxanes.

SUMMARY OF THE INVENTION

The present invention provides in one of its aspects a method for restricting air entrapment in the white water of a paper making process characterised in that the method comprises adding to said white water a polysiloxane having an Si—C bonded substituent with at least one ether or alcohol oxygen.

The method according to the invention can provide improved processing for example through improved drainage on the wire, accelerated drainage rate, increased energy saving at the drying step and increased production rate. In addition, the quality of the paper sheet formed by the process may be improved.

DETAILED DESCRIPTION OF THE INVENTION

The polysiloxanes useful in the process of the present invention comprise a polysiloxane backbone and at least one Si—C bonded substituent with at least one ether or alcohol oxygen. Ether oxygens link two carbon atoms together, while alcohol oxygens, where used herein, link a hydrogen atom and a carbon atom, thus forming a C—OH alcohol group.

It is generally preferred to use a polysiloxane having the following formula:

$$QR^1{}_2SiO(R^1GSiO)_j(R^1{}_2SiO)_kSiR^1{}_2Q \qquad (1)$$

In this structure, $R^1$ is a monovalent hydrocarbon group having 1 to 30 carbon atoms. Preferably $R^1$ is a non-halogenated hydrocarbon group, as the use of halogen containing groups tends to be undesirable in the paper making process described above. Examples of groups suitable as $R^1$ include alkyl radicals such as methyl, ethyl, propyl, butyl, hexyl, octyl and decyl; alkenyl groups, e.g. vinyl, allyl and hexenyl; cycloaliphatic groups such as cyclohexyl; aryl groups such as phenyl, tolyl and xylyl; arylalkyl groups such as benzyl and phenylethyl. Preferred $R^1$ groups include methyl and phenyl. Most preferably substantially all $R^1$ groups are methyl radicals.

In the above formula (1), Q is $R^1$ or G. G has the average structure:

$$—D(OR')_pZ \qquad (2)$$

$$\text{or } —D'((OR')_p Z)_{z-1} \qquad (3)$$

In formula (2) D is a divalent hydrocarbon radical having from 1 to 30 carbons atoms. Examples of suitable groups D include alkylene radicals including methylene, ethylene, iso-propylene, butylene, iso-butylene, phenylene, trimethylene, 2-methyltrimethylene, pentamethylene, hexamethylene, 3-ethyl-hexamethylene, octamethylene and —(CH$_2$)$_{18}$—, cycloalkylene-containing radicals such as cyclohexylene, alkenylene radicals, e.g. propenylene, vinylene, hexenylene, arylene radicals such as phenylene, combinations of divalent hydrocarbon radicals such as benzylene (—C$_6$H$_4$CH$_2$—). Preferably D is a divalent hydrocarbon radical having from 2 to 20 carbon atoms. Most preferably D is a trimethylene group.

In formula (3), D' is a trivalent or multivalent hydrocarbon group having 1 to 30 carbon atoms, R' and Z are as defined for formula (2) and z denotes the valency of the hydrocarbon group D'. Examples of suitable groups D' include —C—CH=, —C=C=, —C—C—. Groups G of structure (2) are however, preferred.

R' in the above formulae (2) and (3) is an alkylene radical having up to 10 carbon atoms, preferably from 2 to 10 carbon atoms. R' is exemplified by methylene, ethylene, propylene, isopropylene, butylene, iso-butylene, hexylene, octylene or a decylene radical. Most preferably R' contains from 2 to 4 carbon atoms. It is noted that if multiple (OR') groups are present in the molecule the groups can be a combination of alkylene oxide radicals such as, for example, a combination of ethylene oxide and propylene oxide units.

p in the above formulae (2) and (3) has a value from 0 to 50 inclusive, provide that if p is zero, the capping group Z in formula (2) contains the requisite ether or alcohol oxygen.

Z is a capping group selected from the group consisting of —OR$^2$, R$^3$ and —OC(O)R$^3$. R$^2$ is hydrogen or a group R$^3$, which is a monovalent hydrocarbon group having 1 to 18, preferably 1 to 6 carbon atoms such as methyl, ethyl, propyl, butyl or phenyl, optionally substituted with one or more hydroxyl groups and/or alkoxy groups, having up to 6 carbon atoms. Examples of suitable groups Z include —OH, —O(CH$_2$)$_r$OH, O(Ch$_2$(C$_6$H$_{10}$)CH$_2$OH, —OCH$_3$, —CH$_3$, —C(CH$_2$OH)$_2$—CH$_2$CH$_3$, —C$_6$H$_4$,m—OCH$_3$,p—OH and CH(OH)—CH$_2$)$_4$—CH$_3$, where r denotes an integer.

In the above formula (1), j has a value from 0 to 150 inclusive, provided that if j is 0, at least one of the groups Q is G. Preferably j is from 1 to 30.

In the above formula, k has a value of from 0 to 1,500 or more. Preferably k is from 1 to 200.

Examples of suitable groups G, which must include at least one ether or alcohol oxygen atom, include oxyalkylene containing substituents, mono- and multiple alcohol-functional substituents and phenol-containing substituents.

In a first preferred method according to the invention, the polysiloxane having an Si—C bonded substituent with at least one ether or alcohol oxygen is a polysiloxane oxyalkylene copolymer or polysiloxane polyoxyalkylene copolymer. Many of these materials are known and commercially available. They are characterised by the presence of alkylene oxide units in the G radical, resulting for the most preferred materials in the following structure for G:

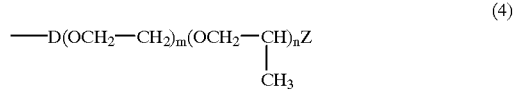

(4)

in which D and Z are as defined above. Preferably, Z is an —OH or an —OC(O)R$^3$ group. The most preferred Z is —OC(O)CH$_3$. The symbol m which defines the number of —(OCH$_2$—CH$_2$) units can have a value as low as 0 and can range up to 50 or more. Preferably m will have an average value of from 0 to 20. The symbol n which defines the number of —(OCH$_2$—CH(CH$_3$)) units can have a value as low as 0 and can range up to 50 or more. Preferably n will have an average value of 0 to 20. Where oxyalkylene groups are present in G according to formula (4), m+n must have a value of at least 2.

Particularly preferred groups G have the structure:

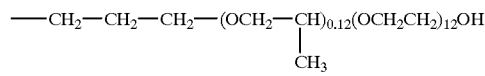

or

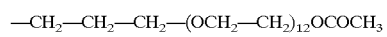

In another preferred method according to the invention, the polysiloxane having an Si—C bonded substituent with at least one ether or alcohol oxygen is a polysiloxane oxyalcohol polymer or polysiloxane polyoxyalcohol copolymer. These materials are characterised by the presence of an oxyalcohol group on the polysiloxane and G has the structure (2) or (3), wherein D and D' are as defined above, p is 1, R' is —CH$_2$ and Z is a substituent having one or more hydroxyl groups linked to carbon atoms. It may have the formula

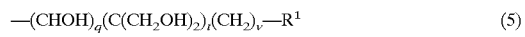

wherein q, t and v independently have a value from 0 to 10 inclusive and R$^4$ is a hydrogen, hydroxyl or a hydrocarbon radical having from 1 to 6 carbon atoms. It is preferred that either q or t has a value of 0, and that when q and t are 0, R$^4$ is a carbon-bonded hydroxyl group. The groups (CHOH), (C(CH$_2$OH)$_2$) and (CH$_2$) may be present in any order. It is however clear to the person skilled in the art that other substituents are also possible.

The preferred structure of G, when it represents an oxyalcohol group is

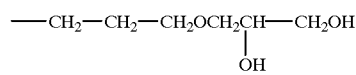

Some oxyalcohol containing materials are known in the art and are described, for example, in U.S. Pat. No. 5,262,155.

The group G of formula (1) may also be a alcohol group, which has the same structure as the oxyalcohol, with the exception of the ether oxygen group. Aromatic alcohols and substituted alcohols may also be used. Examples of the latter include eugenol substituted siloxanes.

Polysiloxanes which are useful in a method according to the present invention may be made by known processes. A suitable process for making the polysiloxanes is a hydrosilylation reaction between a polysiloxane material having some silicon-bonded hydrogen atoms and alkenyl end-blocked alcohols, oxyalcohols, polyoxyalkylenes and other compounds having an ether or alcohol oxygen present as defined above.

The polysiloxanes having an Si—C bonded substituent with at least one ether or alcohol oxygen as described above can be diluted in a suitable solvent, if desired. Generally, it is preferred that they are used undiluted. In the most preferred method, the polysiloxanes are used as the only addition to the white water. It is particularly preferred that the polysiloxanes are used in the absence of any inorganic fillers, such as silica, as fillers of that kind are likely to be deposited on the cellulosic fibres of the paper, and cause a lowering of the quality of the paper thus produced. It is however possible to use suitable polysiloxanes in a method according to the invention in conjunction with one or more known foam control agents, e.g. $C_{7-22}$ alcohols, polyalkylene glycols, fatty acids, fatty acid esters, amides and organic phosphates, as mentioned above. The polysiloxanes, whether used alone or in conjunction with other foam control agents may also be provided in emulsion form. It is even possible, though not preferred, to provide emulsions which comprise the polysiloxanes and other foam control agents.

In a method according to the invention, the polysiloxane having an Si—C bonded substituent with at least one ether or alcohol oxygen is added to white water in the paper making process. As used herein, white water comprises the free-draining water present at any stage in the paper making process, including the recirculation route of the white water. Preferably, the polysiloxane having an Si—C bonded substituent with at least one ether or alcohol oxygen is added to the white water immediately before the white water enters the wire pit.

The polysiloxanes having an Si—C bonded substituent with at least one ether or alcohol oxygen can be added to any of these sources of white water by any convenient means and at a concentration sufficient to restrict air entrapment. Generally, a sufficient concentration is in the range of from about 0.001 wt % to about 1 wt. %, preferably from about 0.01 to about 0.1 wt. % based on the weight of the white water.

The method according to the invention can provide improved processing including one or more of improved drainage on the wire, accelerated drainage rate, increased energy saving at the drying step and increased production rate. In addition, the quality of the paper sheet produced may be improved.

In order that the invention may be more fully understood, there now follows a number non-limiting examples which illustrate the invention. All parts and percentages are given by weight unless otherwise indicated.

EXAMPLE 1

To exemplify the method for restricting air entrapment according to the invention, a polysiloxane (B) having an Si—C bonded substituent with at least one ether oxygen of the formula:

$$(CH_3)_3SiO(CH_3GSiO)_2((CH_3)_2SiO)_{22}Si(CH_3)_3 \quad (B)$$

wherein G=—$CH_2$—$CH_2$—$CH_2$—(O$CH_2$—$CH_2$)$_{12}$OC(O)$CH_3$, was added to a laboratory Foudrinier paper making system at a concentration of 0.01 weight % in white water. This was compared to a comparative polydimethylsiloxane (A), not being a polysiloxane for use in a method according to the invention, commercialized by Huels under the trade name Antaphron NE 4561. Both polysiloxane (B) having an Si—C bonded substituent with at least one ether oxygen and the comparative (A) were submitted to a dry line test.

The dry line test measures the line where a glassy layer of water is present on the top of the moving fabric on the Foudrinier paper making system. The dry line is an indicator of the wet end operations of the paper making process and is influenced by the quantity of air bubbles entrapped during drainage.

When comparative polydimethylsiloxane (A) and the polysiloxane (B) are added to white water, a resulting dry line migration is observed. The results are reported in Table 1 as percentage values of the dry line obtained without any addition to white water. A larger % dry-line migration indicates a more efficient process.

TABLE 1

| Additive | Dry Line Test: Concentration (wt. %) | % Dry-line migration |
|---|---|---|
| None | 0 | 0 |
| A | 0.05 | 35 |
|   | 0.1 | 38 |
| B | 0.002 | 66 |
|   | 0.1 | 70 |

It is clear from the results that there is an improvement in the dry line migration when polysiloxane (B) is added to the white water.

EXAMPLE 2

The method for restricting air entrapment according to the invention is exemplified with polysiloxane oxyalcohol polymers had the following structure (6), where the parameters j and k are as set forth in Table 2.

$$(CH_3)_3SiO(CH_3GSiO)_j((CH_3)_2SiO)_kSi(CH_3)_3 \quad (6)$$

wherein

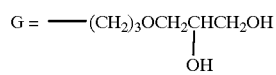

TABLE 2

| Polysiloxane Oxyalcohol | j | k |
|---|---|---|
| A | 9 | 216 |
| B | 15 | 35 |
| C | 18 | 233 |
| D | 20 | 180 |
| E | 4 | 16 |
| F | 6 | 54 |
| G | 16 | 84 |
| H | 15 | 85 |
| I | 10 | 90 |
| J | 10 | 40 |
| K | 8 | 12 |
| L | 12 | 8 |

This Example used a pump test with a paper slurry prepared in a laboratory, by mixing 15 g of newspaper and 15 g of magazine paper with 5 g of chalk, soaking the paper mixture in 700 ml of tap water and allowing it to stand for a few minutes, followed by agitating the mixture with a Warring Blender mixer for 10 minutes. The resultant paper slurry is then diluted in a 3 liter beaker with 800 ml tap water and brought up to a temperature of 48–50° C. 500 ml of the diluted paper slurry is sized by the addition of 30 ml of a 10% solution of abietic acid in water and 1.7 ml of a 14% aluminium sulphate solution in water. After addition of this sizing, the pH value of the slurry is between 5.8 and 6.2.

In the pump test, 500 ml of the slurry described above is introduced into a calibrated cylinder and submitted to agitation by a pump. The temperature is kept at 50° C. and the volume is brought to around 600 ml by air entrapment. 10 microliter of the polysiloxane having an Si—C bonded substituent with at least one ether oxygen according to Table 2 is then introduced into the cylinder and the pump is turned on for 1 minute. The foam level is recorded. The test is continued for 5 minutes with further addition each minute of polysiloxane having an Si—C bonded substituent with at least one ether oxygen and further recording of the volume level. The results are reported in Table 3. A comparative test is carried out with a comparative siloxane-based foam control emulsion commercialised under the name Dow Corning® 2-1517 EU antifoam emulsion. The results are presented in Table 3, which shows the volume or air and paper slurry combined after 1, 2, 3, 4 and 5 minutes for each of the oxyalcohol containing polysiloxanes.

TABLE 3

| Polysiloxane Oxyalcohol | time | 1 | 2 | 3 | 4 | 5 | minutes |
|---|---|---|---|---|---|---|---|
| | | Pump Test Volume air/paper slurry (ml) | | | | | |
| A | | 600 | 600 | 595 | 592 | 591 | |
| B | | 597 | 590 | 581 | 575 | 563 | |
| C | | 600 | 600 | 597 | 593 | 592 | |
| D | | 600 | 599 | 592 | 591 | 585 | |
| E | | 592 | 590 | 584 | 581 | 581 | |
| F | | 600 | 600 | 594 | 591 | 591 | |
| G | | 600 | 592 | 591 | 590 | 572 | |
| H | | 600 | 599 | 594 | 591 | 582 | |
| I | | 600 | 597 | 591 | 590 | 585 | |
| J | | 592 | 585 | 578 | 572 | 561 | |
| K | | 572 | 563 | 553 | 541 | 537 | |
| L | | 576 | 571 | 549 | 537 | 533 | |
| Comparative | | 610 | 620 | 650 | 630 | 640 | |

It is clear from the results in Table 5 that the polysiloxane oxyalcohol polymers perform better than the comparative material.

EXAMPLE 3

The following materials with general formula (7) were prepared according to known procedures (details of the structure are given in Table 4):

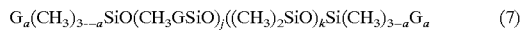

$$G_a(CH_3)_{3-a}SiO(CH_3GSiO)_j((CH_3)_2SiO)_kSi(CH_3)_{3-a}G_a \quad (7)$$

wherein G is

—(CH$_2$)$_2$O(CH$_2$)$_4$OH  (G1)

or —(CH$_2$)$_3$OH  (G2)

or —(CH$_2$)$_{11}$OH  (G3)

TABLE 4

| Polysiloxane | G | j + k | a | mole % G |
|---|---|---|---|---|
| M | G2 | 20 | 0 | 60 |
| N | G2 | 19 | 0 | 45 |
| O | G3 | 19 | 0 | 45 |
| P | G3 | 27 | 0 | 7.5 |
| Q | G3 | 139 | 0 | 11.5 |
| R | G1 | 100 | 0 | 1.5 |
| S | G1 | 100 | 0 | 4.7 |
| T | G1 | 100 | 0 | 10 |

TABLE 4-continued

| Polysiloxane | G | j + k | a | mole % G |
|---|---|---|---|---|
| U | G1 | 100 | 1 | 2 |
| V | G1 | 50 | 1 | 4 |
| W | G1 | 25 | 1 | 6 |

These materials were then introduced into a pump test as described above, except that the temperature was 53 C, 30 g of newspaper was used without any magazine paper, 20 ml of a 10% solution of abietic acid and 1 ml of a 14% aluminium sulphate solution, and that the amount of polysiloxane used was 5 mg. The results are shown in Table 5.

TABLE 5

| Polysiloxane | time | 1 | 2 | 3 | minutes |
|---|---|---|---|---|---|
| | | Pump Test Volume air/paper slurry (ml) | | | |
| M | | 578 | 559 | 552 | |
| N | | 600 | 580 | 580 | |
| O | | 578 | 557 | 560 | |
| P | | 584 | 580 | 580 | |
| Q | | 596 | 587 | 583 | |
| R | | N/A | N/A | 570 | |
| S | | N/A | N/A | 566 | |
| T | | N/A | N/A | 559 | |
| U | | N/A | N/A | 570 | |
| V | | N/A | N/A | 566 | |
| W | | N/A | N/A | 557 | |

EXAMPLE 4

Polysiloxanes K, M and N of Examples 2 and 3 respectively were mixed with Nafol® 20+A (a fatty alcohol having an average chainlength of 20 carbon atoms) and emulsified to form 30% oil-in-water emulsion X, Y and Z respectively. Polysiloxane B of Example 1 was diluted in butyl diglycol to form a 50% solution AA. The emulsions and solutions were used in the pump test identified above, except that the test was carried out at 63 C and that 5 mg active antifoam was used (i.e. total weight of polysiloxane and fatty alcohol or glycol). Results are given in Table 6, together with the results of Afranil® HTO, which is a 30% emulsion of Nafol 20+A.

TABLE 6

| Polysiloxane | time | 1 | 2 | 3 | minutes |
|---|---|---|---|---|---|
| | | Pump Test Volume air/paper slurry (ml) | | | |
| X | | 572 | 563 | 563 | |
| Y | | 596 | 584 | 568 | |
| Z | | 582 | 573 | 573 | |
| Afranil HTO | | 596 | 596 | 596 | |
| AA | | 588 | 568 | 568 | |
| Butyl diglycol | | 600 | 600 | 592 | |

EXAMPLE 5

The following polysiloxanes were prepared with general structure (8), details being given in Table 7

$$(CH_3)_3SiO(CH_3GSiO)_j((CH_3)_2SiO)_kSi(CH_3)_3 \quad (8)$$

wherein G is $$-(CH_2)_2C(CH_3)_2OH \quad (G4)$$

$$\text{or} -(CH_2)_2O\ CH_2-C_6H_{10}CH_2OH \quad (G5)$$

$$\text{or} -(CH_2)_2(OCH_2CH_2)_3OCH_3 \quad (G6)$$

$$\text{or} -(CH_2)_3OCH_2C(CH_2OH)_2CH_2CH_3 \quad (G7)$$

$$\text{or} -(CH_2)_3C_6H_3(m-OCH_3)o-OH \quad (G8)$$

$$\text{or} -CH=CH\ CH(OH)(CH_2)_4CH_3 \quad (G9)$$

or

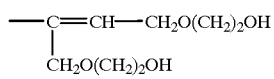

TABLE 7

| Polysiloxane | G | j + k | mole % G |
|---|---|---|---|
| BB | G4 | 20 | 40 |
| CC | G5 | 20 | 40 |
| DD | G6 | 15 | 12 |
| EE | G7 | 20 | 40 |
| FF | G8 | 20 | 40 |
| GG | G9 | 20 | 40 |
| HH | G10 | 15 | 12 |

The polysiloxanes were used in pump test as described above, except that temperature was 60° C., 25 mg active siloxane was used in 500 ml of a 2% paper slurry. Results are given in a relative change compared to the initial foam height, first reading taken 15 seconds (knock down) after adding the polysiloxane, and then after 1 and 3 minutes, given in cm (+values where the foam level increases,, −values where the foam level decreases). Results are shown in Table 8.

TABLE 8

| | Pump Test | | |
|---|---|---|---|
| | Volume air/paper slurry (ml) | | |
| Polysiloxane time | 15 s | 1 m | 3 m |
| BB | −0.6 | −0.5 | −0.3 |
| CC | −0.6 | −0.2 | −0.3 |
| DD | −0.9 | −0.4 | −0.3 |
| EE | −1.0 | −0.9 | −0.6 |
| FF | −0.6 | −0.5 | −0.2 |
| GG | −0.5 | −0.4 | −0.2 |
| HH | −1.8 | −0.2 | +0.1 |

That which is claimed is:

1. A method for restricting air entrapment in white water of a paper making process which comprises the step of adding to said white water a polysiloxane having the formula:

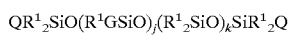

wherein each $R^1$ is independently a monovalent hydrocarbon group having 1 to 30 carbon atoms, Q is selected from the group consisting of $R^1$ and G, and G is selected from the group consisting of a radical having the average structure $$-D(OCH_2)Z$$

and a radical having the general structure $$-D'((OCH_2)Z)_{z-1}$$

wherein D is a divalent hydrocarbon radical having from 1 to 30 carbons atoms, D' is selected from tri and multi(z) valent hydrocarbon radicals having from 1 to 30 carbon atoms, Z is a substituent having one or more hydroxyl groups linked to carbon atoms, j has a value from 0 to 150 inclusive, provided that if j is 0, at least one of the groups Q is G, k has a value of from 0 to 1,500 or more and z denotes the valency of hydrocarbon D'.

2. A method according to claim 1, wherein $R^1$ is methyl, G has the formula $-D(OCH_2)Z$ wherein D is a divalent hydrocarbon radical having from 2 to 20 carbon atoms and Z is a substituent having one or more hydroxyl groups linked to carbon atoms, k is from 1 to 200, j is from 1 to 30, Q is $R^1$.

3. A method according to claim 1, wherein $R^1$ is methyl, G has the formula $-D'((OCH_2)Z)_{z-1}$ wherein D' is selected from the group consisting of $-C-CH=$, $-C=C=$, and $-C-C\equiv$ and Z is a substituent having one or more hydroxyl groups linked to carbon atoms, k is from 1 to 200, j is from 1 to 30, Q is $R^1$.

4. A method according to claim 1, wherein Z is a substituent having at least one hydroxyl group linked to carbon atoms, having the formula

wherein q, t and v independently have a value from 0 to 10 inclusive and $R^4$ is selected from the group consisting of hydrogen, hydroxyl and a hydrocarbon radical having from 1 to 6 carbon atoms.

5. A method according to claim 1, wherein G is an oxyalcohol group of the formula

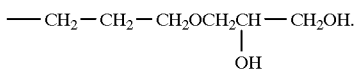

6. A method according to claim 1, wherein the polysiloxane is provided in a diluted form in a solvent.

7. A method according to claim 1, wherein the polysiloxane is provided in an emulsion form.

8. A method according to claim 1, wherein the polysiloxane is used in conjunction with a foam control agent selected from the group consisting of $C_{7-22}$ alcohols, polyalkylene glycols, fatty acids, fatty acid esters, amides and organic phosphates.

9. A method according to claim 1, wherein the polysiloxane is used in a concentration in the range of from about 0.001 wt % to about 1 wt. % based on the weight of the white water.

10. A method according to claim 1, wherein the method comprises adding the polysiloxane to the white water immediately before the white water enters a wire pit of a paper making machine.

11. A method according to claim 2, wherein D is trimethylene and Z is a substituent having at least one hydroxyl group linked to carbon atoms, having the formula

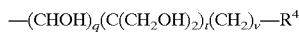

wherein q, t and v independently have a value from 0 to 10 inclusive and $R^4$ is selected from the group consisting of hydrogen, hydroxyl and a hydrocarbon radical having from 1 to 6 carbon atoms.

12. A method according to claim 11, wherein the polysiloxane is used in a concentration in the range of from about 0.001 wt % to about 1 wt. % based on the weight of the white water.

13. A method according to claim 2, wherein G is an oxyalcohol group of the formula

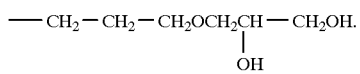

14. A method according to claim 2, wherein the polysiloxane is used in a concentration in the range of from about 0.001 wt % to about 1 wt. % based on the weight of the white water.

15. A method according to claim 3, wherein Z is a substituent having at least one hydroxyl group linked to carbon atoms, having the formula

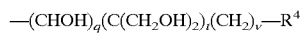

wherein q, t and v independently have a value from 0 to 10 inclusive and $R^4$ is selected from the group consisting of hydrogen, hydroxyl and a hydrocarbon radical having from 1 to 6 carbon atoms.

16. A method according to claim 4, wherein the polysiloxane is used in a concentration in the range of from about 0.001 wt % to about 1 wt. % based on the weight of the white water.

17. A method according to claim 5, wherein the polysiloxane is used in a concentration in the range of from about 0.001 wt % to about 1 wt. % based on the weight of the white water.

18. A method according to claim 13, wherein the polysiloxane is used in a concentration in the range of from about 0.001 wt % to about 1 wt. % based on the weight of the white water.

* * * * *